United States Patent [19]

King

[11] Patent Number: 5,121,959
[45] Date of Patent: Jun. 16, 1992

[54] SLIDE MOUNT FOR PICK-UP TRUCK TOOLBOXES

[76] Inventor: Timothy P. King, 2087-140th St. NW., Shakopee, Minn. 55379

[21] Appl. No.: 652,292

[22] Filed: Feb. 5, 1991

Related U.S. Application Data

[63] Continuation of Ser. No. 478,135, Feb. 9, 1990, abandoned, which is a continuation-in-part of Ser. No. 342,295, Apr. 24, 1989, abandoned.

[51] Int. Cl.$^5$ ............................................. B60R 9/06
[52] U.S. Cl. ................................................. 296/37.6
[58] Field of Search ................. 296/37.6; 224/312; 238/134, 135

[56] References Cited

U.S. PATENT DOCUMENTS

| | | | |
|---|---|---|---|
| 3,027,091 | 3/1962 | Small et al. | 238/134 |
| 4,199,188 | 4/1980 | Albrecht et al. | 296/100 |
| 4,406,386 | 9/1983 | Rasor et al. | 248/297.2 X |
| 4,522,326 | 6/1985 | Tuohy | 296/37.6 X |
| 4,531,774 | 7/1985 | Whatley | 296/37.6 |
| 4,635,992 | 1/1987 | Hamilton et al. | 296/37.6 |
| 4,752,095 | 6/1988 | Brady | 296/37.6 |
| 4,823,704 | 4/1989 | Fujita et al. | 238/135 X |

Primary Examiner—Margaret A. Focarino
Assistant Examiner—Gary C. Hoge
Attorney, Agent, or Firm—John W. Adams

[57] ABSTRACT

A slide mount for pick-up truck carriages which includes a mounting frame adapted to be connected under the ends of a transverse mounted toolbox with suitable rollers carried by the frame for supporting the toolbox and permitting the same to be transferred along the sides of a truck body on suitable rails mounted on the upper edges of the truck body sides with means for stabilizing roller movement of the toolbox and means for locking the toolbox in different positions along the length of the truck body in accordance with the desired functional position of the toolbox.

17 Claims, 4 Drawing Sheets

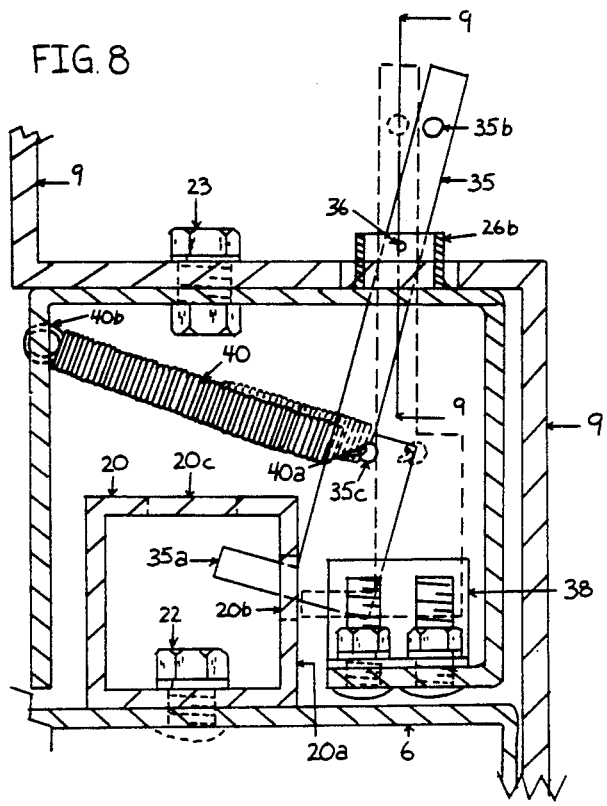
FIG. 8
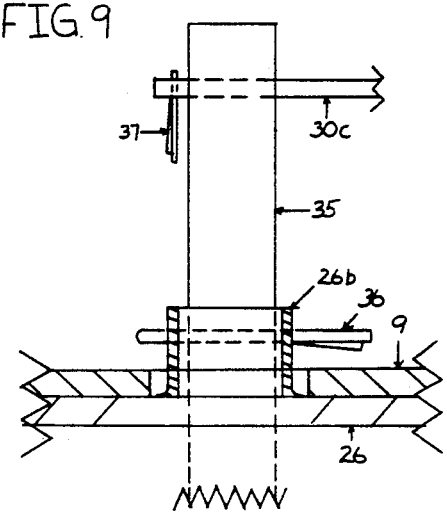
FIG. 9
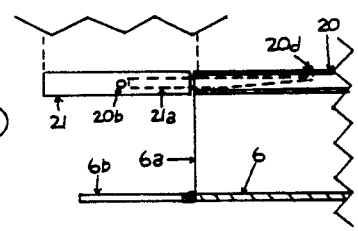
FIG. 10
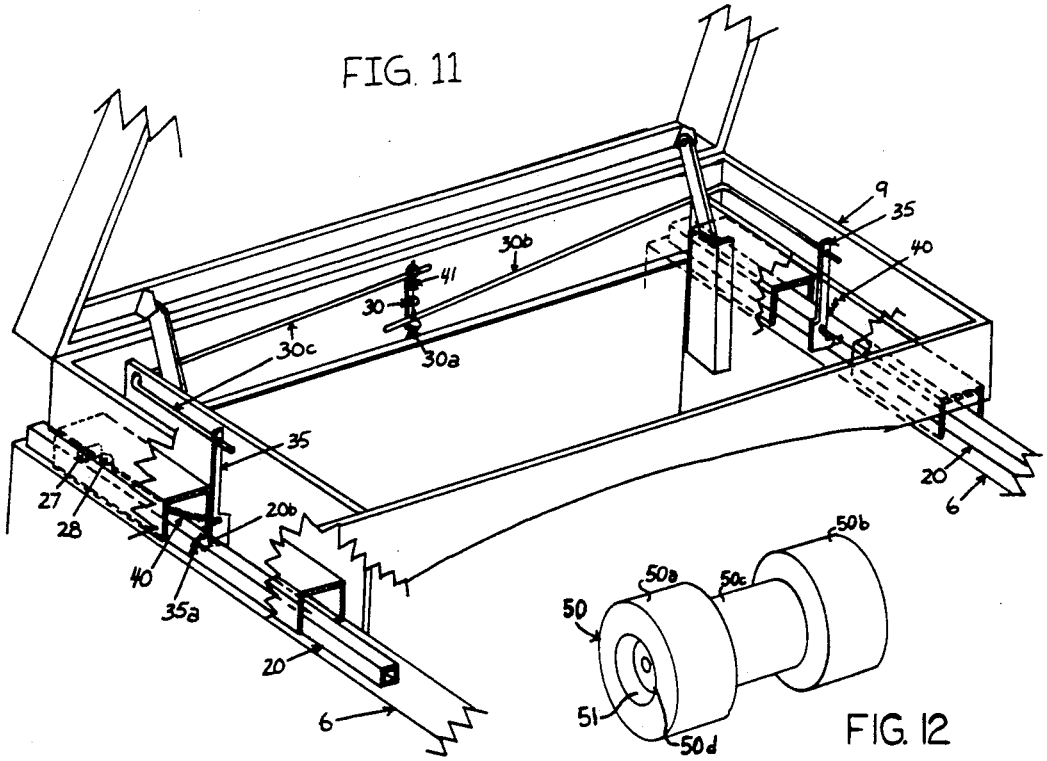
FIG. 11
FIG. 12

SLIDE MOUNT FOR PICK-UP TRUCK TOOLBOXES

This is a continuation of pending application Ser. No. 7/478,135, filed Feb. 9, 1990, (now abandoned) which in turn was a continuation-in-part of orginal U.S. application Ser. No. 7/342,295, filed Apr. 24, 1989 (now abandoned) also entitled Slide Mount for Pick-up Truck Toolboxes.

BACKGROUND OF THE INVENTION

For many years toolboxes have been mounted across the front of a pick-up truck body. The positioning of the toolbox at the front end of the truck body makes access to the box relatively difficult. A number of different slide mechanism have been developed for permitting the box to be moved to the back of the truck body when in use and otherwise stored in the front of the body. Such devices are embodied in the following U.S. patents:

| U.S. PAT. NO. | ISSUE DATE | PATENTEE |
| --- | --- | --- |
| 2,784,027 | March 5, 1957 | Temp |
| 3,471,045 | October 7, 1967 | Panciocco |
| 3,826,529 | July 30, 1974 | Wood |
| 4,488,669 | December 18, 1984 | Waters |
| 4,681,360 | July 21, 1987 | Peters et al |
| 4,752,095 | June 21, 1988 | Brady |

It will be apparent that none of these prior art concepts provides a simple slide unit adapted for use with a number of different toolbox constructions.

SUMMARY OF THE INVENTION

The present invention embodies a pair of slide rails mounted on the top edges of the sides of a truck body and having a pair of carriage assemblies each having a pair of main support rollers riding on the surface of the slide rails. The rails are provided with a series of positioning openings and each carriage assembly include an anchoring mechanism which is selectively received in the openings to lock the box in the desired longitudinally adjusted position on the slide rails. Each carriage includes stabilizing means such as pair of stabilizing rollers engaging the slide rails and maintaining the cross alignment of the two carriage assemblies. The construction of the rails and carriage assembly rollers permit the box to not only be adjusted to any desired position along the length of the truck body, but also permits easy removal of the box from the rails to open up the entire load carrying compacity of the body space. Also, an extension is provided for extending the slide rails rearwardly over the lowered tail gate for easy accessability to the box.

DETAILED DESCRIPTION OF THE DRAWINGS

FIG. 8 is a transverse sectional view taken substantially on line 8—8 of FIG. 6.

FIG. 9 is a fragmentary sectional view taken substantially on line 9—9 of FIG. 8.

FIG. 10 is a fragmentary sectional view of the end of a pick-up truck body showing the extension of the slide rail;

FIG. 11 is a perspective view of the inside of the toolbox showing the cross linkage assembly and latching mechanism; and FIG. 12 is a perspective view of a combined support roller and stabilizing roller.

DETAILED DESCRIPTION OF THE PREFERRED EMBODIMENT

Figure 1:
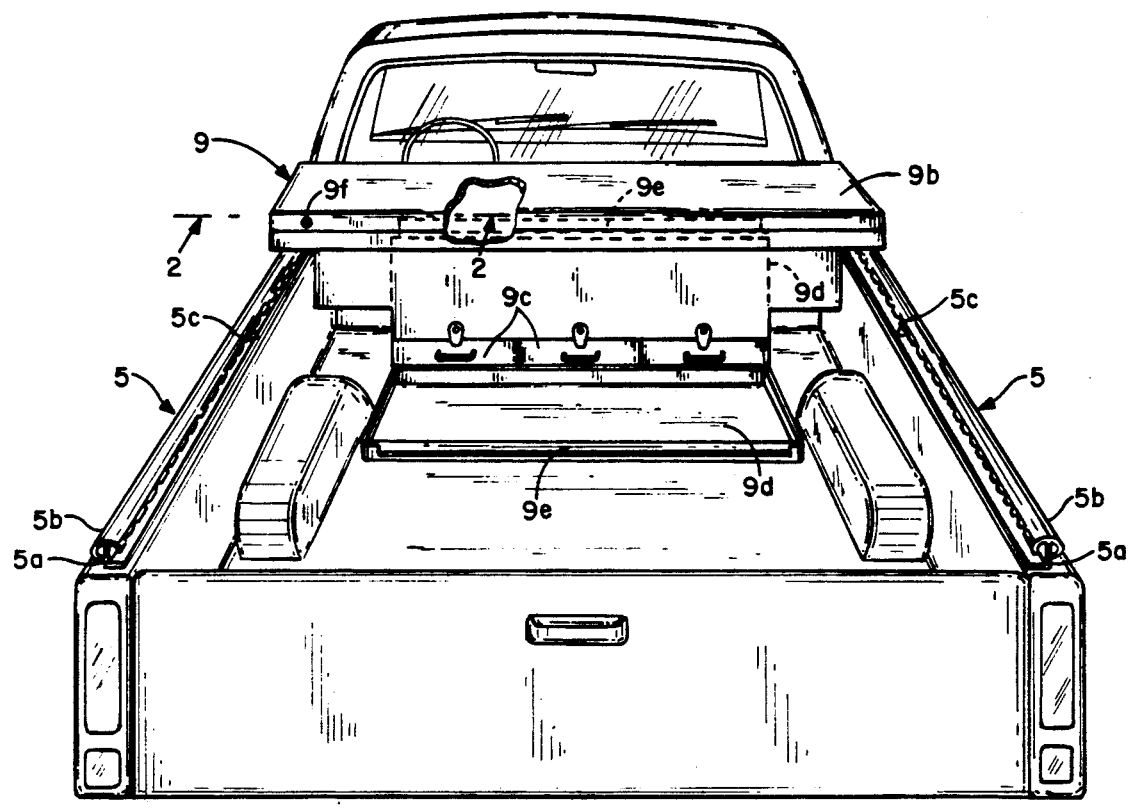
FIG. 1 is a perspective view of a truck body equipped with this invention.
Figure 2:
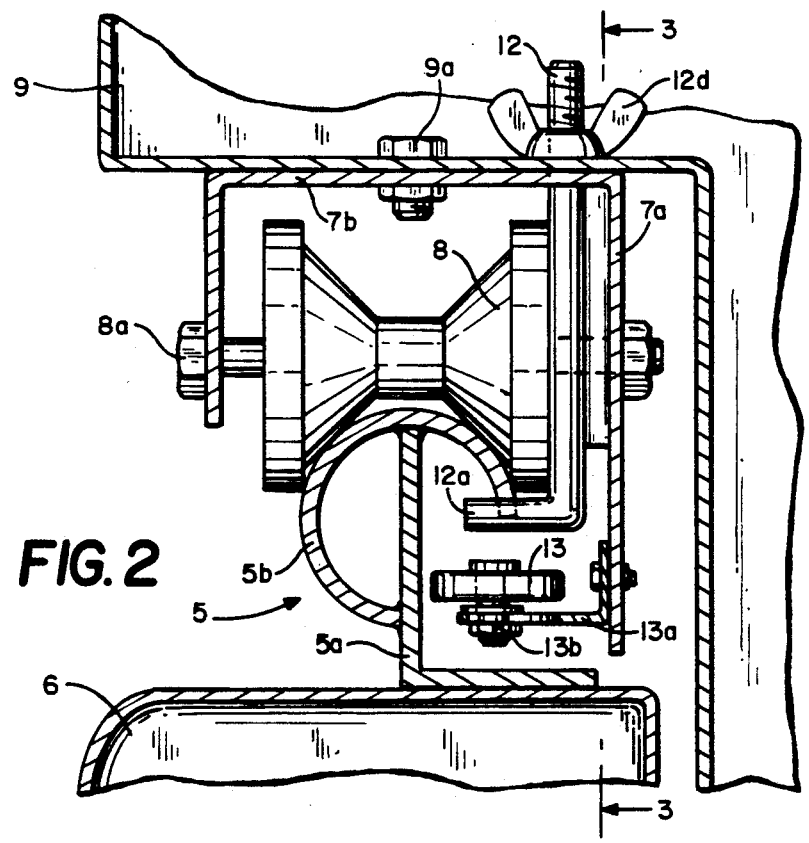
FIG. 2 is a transverse sectional view through one of the slide rails and roller assemblies as mounted on the top of a side of the trunk body.
Figure 3:
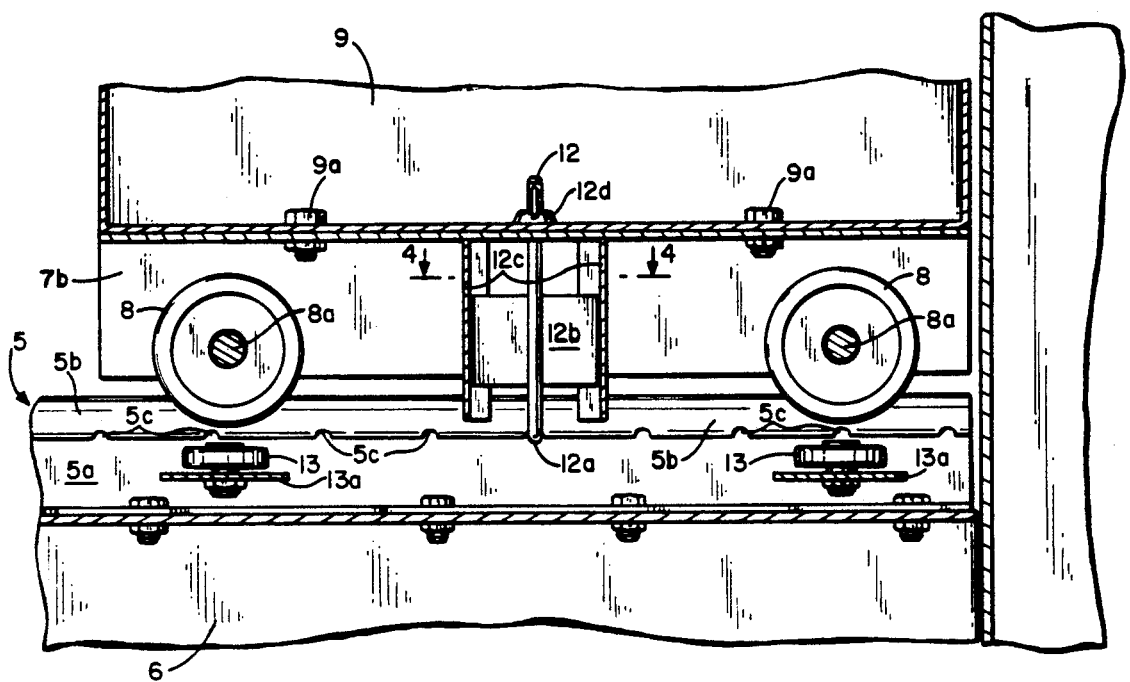
FIG. 3 is a fragmentary sectional view taken substantially along the line 3—3 of the FIG. 2 and showing the anchoring mechanism.
Figure 4:
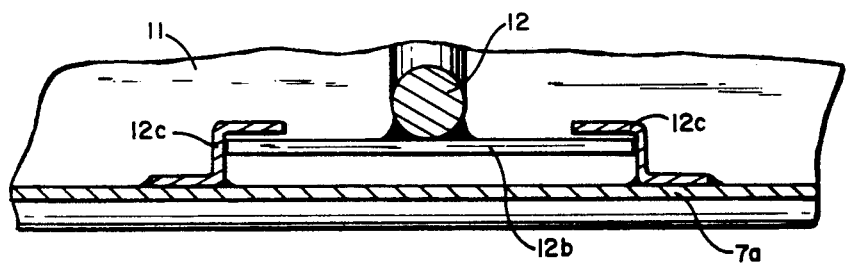
FIG. 4 is a fragmentary horizontal sectional view taken substantially along the line 4—4 of FIG. 3.

FIG. 1 is a rear perspective view showing the box 6 of a pickup truck with may rail unit 5 mounted on the box. A mounting bracket 5a is fixed to the top edge of each side of the pick-up box and the bracket is fixed to a slide rail member 5b in the form of an elongated semi-cylindrical segment which extends the full length of the box as illustrated. Each rail 5b has a plurality of spaced apart notches 5c formed along the lower inner free edge thereof.

A pair of carriage assemblies 7 are respectively mounted on the two rail units 5 and each includes a mounting housing 7a having a pair of generally V-shaped main rollers 8 journaled thereon as by axle spindles 8a. The top of each housing 7a is secured to the bottom of a toolbox 9 as by enclosed attachment bolts 9a.

Figure 6:
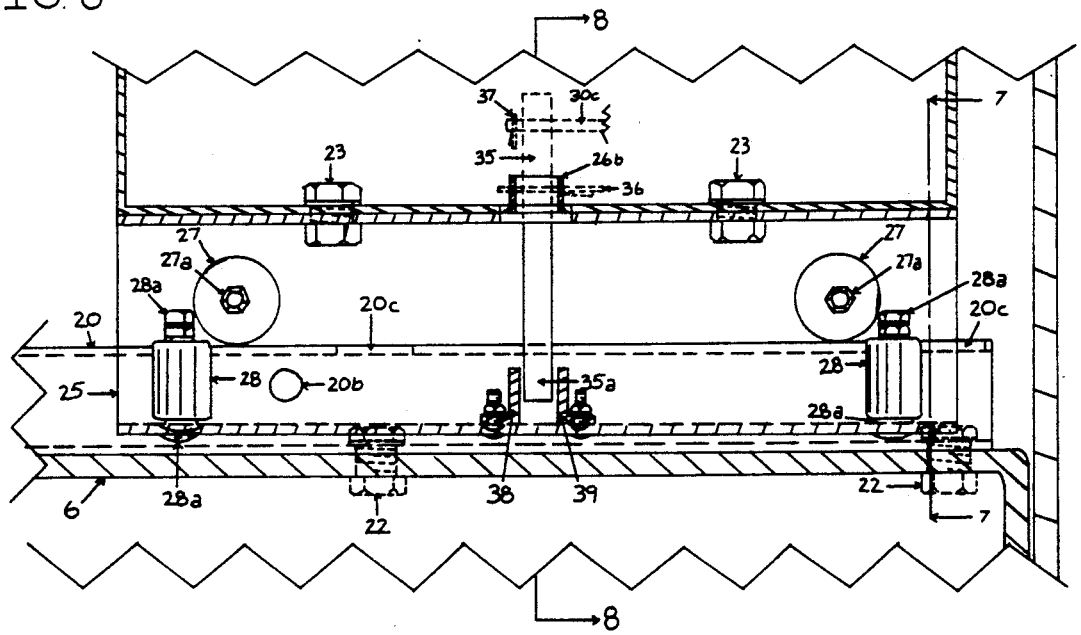
FIG. 6 is a fragmentary sectional view through one of the slide rails and roller assemblies as mounted on the top of the side of the truck body.

The toolbox 9 is of conventional design as shown in FIGS. 1 and 6. The toolbox 9 has a pair of laterally extending attachment wings which extend outwardly in overlying relation to the top edge of each side of the truck body 6.

An another device is provided for each carriage assembly 7 and each device has a generally L-shaped locking bolt 12 having a lower notch engaging arm 12a. Each locking bolt 12 is fixed to a stabilizing slide plate 12b which is slidably mounted in a pair of vertical guide angles 12c fixed to the inside of the mounting housing 7a. A wing nut 12d is threadly mounted on the threaded upper end portion of the bolt 12 and engages the inside of the toobox 9 to raise and lower the bolt 12 and slide plate 12b in the guide angles 12c. An anchoring bolt 12 is provided on each carriage assembly 7 and the notch engaging arm 12a is received in a selected notch 5c in the inner edge of rail 5b to positively anchor each carriage assembly 7 and toolbox 9 in the desired position on the truck body.

Suitable stabilizing means may be provided such as a pair of stabilizing rollers 13 mounted on brackets 13a welded to the lower portion of the inner panel of the mounting housing 7a. Each bracket 13a has a suitable elongated mounting slot and a lock unit nut 13b is provided to permit in and out adjustment of each roller 13 with respect to the adjacent inner surface of the mounting bracket 5a.

In the form shown, the toolbox 9 has a hinged cover 9b to secure the attachment bolts 9a and locking bolts 12 within the toolbox 9 to prevent theft.

The box 9 may be provided with a set of pull out drawers 9c slidably mounted in the bottom thereof and having latch elements and a hinged closure panel 9d is connected at the lower rear edge of the box below the drawers 9c. The upper free edge of the closure panel 9d has a locking flange 9e which underlies the rear portion of the depending peripheral flange of the cover 9b to enclose the drawers 9c when the closure panel 9d is in raised closed position shown by dotted lines in FIG. 1.

A suitable lock 9f of conventional design is provided to lock the cover 9b in closed position and each of the drawers 9c may be provided with a latch mechanism of any conventional design to keep the same in closed position when the closure panel is in its down position.

In another form of the invention shown in FIGS. 5-11, the slide rails 20 are generally rectangular or square in cross section and extend from the front of the truck body 6 to the rear thereof on both sides. Each rail 20 is mounted on the top edge of the truck side with a plurality of attachment bolts 22. In this form, the bolts 22 are inserted through access holes 20c in the top of the rail 20 and attach the bottom of the slide rail 20 to the top edge 6a of the truck body 6. Along both insides edges 20a of each rail 20 are a plurality of spaced apart anchoring holes 20b to receive a pivoted latch member 35 and lock the toolbox 9 in the desired position along the truck body. As shown in FIG. 10, the rails 20 may be extended rearwardly beyond the rear end of the truck body 6 by an extension rail 21 having a cantilever attachment portion 21a which is inserted into the rear end of the hollow rail 20. The extension 21 is approximately the same length as the tail gate 6b of the truck and is of the same cross section configuration as the rail 20. The attachment portion 21a is of a tapered configuration to allow for the insertion thereof into the rear end of the slide rail 20. The bottom edge of the attachment portion 21a is tapered to allow the end to be tipped and slid into the slide rail 20. A locking dog 21b on the top of the attachment portion 21 is received into an extension locking hole 20d in the top of rail 20 to provide a cantilever support for the extension 21 as shown in FIG. 10. The extension 21 allows the toolbox 9 to be positioned beyond the rear ends of the truck body and locked into place above the open tailgate of easy access as by rear anchoring holes 20b.

Figure 5:
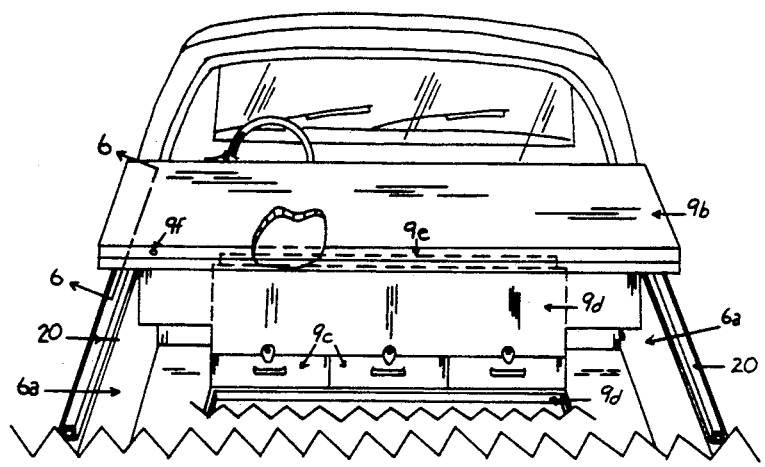
FIG. 5 is a perspective view of the trunk body equipped with rectangular slide rails.
Figure 7:
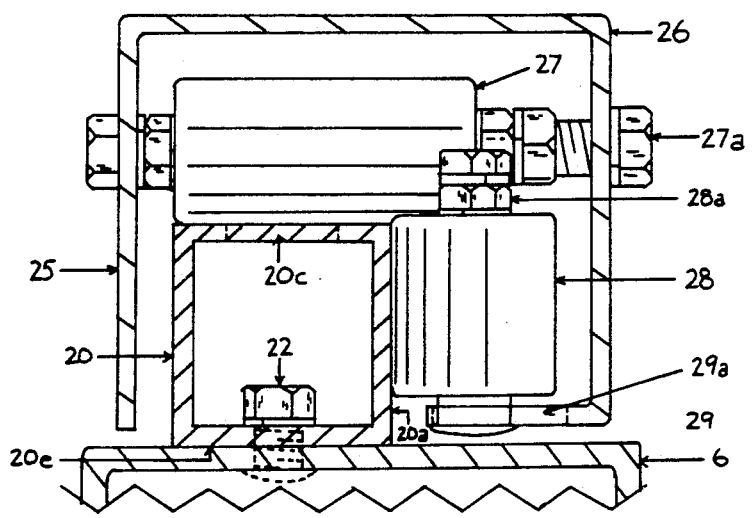
FIG. 7 is a transverse sectional view taken substantially on line 7—7 of FIG. 6.

A pair of carriage assemblies 25 are respectively mounted on the two slide rail units 20 and each includes a mounting housing 26 having a pair of cylindrical support rollers 27 which allow the carriage 25 and attached toolbox 9 to slide on the rails. The top of each housing 26 is secured to the bottom of a toolbox 9 with attachment bolts 23. As best shown in FIG. 5, the toolbox 9 is of conventional design and is of similar construction to the toolbox 9 shown in FIG. 1, with the laterally extending attachment wing portions which overlie the top edges of the sides of the truck body 6 and, when incorporated with applicant's slide mount, are mounted on the carriage assemblies 25. Suitable stabilizing means are provided, such as a pair of stabilizing rollers 28, mounted on the inside of the carriage 26 on axes disposed at 90 degrees to the support rollers 27. As shown in FIG. 7, the support rollers 27 which ride on the top edge of the slide rails 20 are connected to the carriage assembly 26 by the axle spindles 27a. The vertical stabilizing rollers 28 are mounted to ride along the inside of the respective slide rail 20 and are adjustable in an elongated slot 29a provided in mounting bracket 29 to insure smooth travel of the box on the rails.

A pivoted latch member 35 is provided on each carriage 26 to engage selected holes 20b in the inside of the rails 20 and anchor the toolbox 9 in the desired position along the truck body 6 as shown in FIG. 8. The latches 35 shown are generally L-shaped and have hole-engaging lugs 35a and actuating handle portions 35b which are respectively received in selected holes 20b provided on the inside of the rails 20. Each latch 35 is pivoted on a pivoting pin 36, which extends through both the latch lever 35 and the collar 26b and allows the pivoting motion as shown in FIGS. 8 and 9. A conventional spring 40 with one end 40a engaged with the latch lever 35 and the other end 40b connected to the carriage urges the latch into locking position as illustrated in FIG. 8. A pair of latch stabilizing guides 38 and 39 laterally position each latch 35 and stabilizes the latch during its movement in an out of locking position.

The latches 35, positioned on both sides of the toolbox, are simultaneously actuated by a cross linkage assembly 30 illustrated in FIG. 11. Crank rods 30b and 30c have a 90 degree bend to conform to the outer portions of the toolbox 9 and are connected to connecting crank member 30a. The crank rods are attached to both the latch levers 35 and crank member 30a by means of retaining elements respectively, such as pivot pins 37 and 41. When the toolbox 9 is to be moved, one of the latch levers 35 is manually pivoted out of latched position. This actuates the cross linkage assembly 30 to retract the other latch 35 out of its latched positions. When the toolbox 9 is moved into a desired position, and the anchoring holes 20b and then latch lug 35a are aligned therewith the retractred latches 34 are released to enter the holes and lock the toolbox 9 in the desired position.

Another form of the support roller is shown in FIG. 12. A pair of flanged stabilizing and support rollers 50 are provided on each side to replace the cylindrical support rollers 27 and eliminate the need for the stabilizing rollers 28. The support rollers 50 are provided with stabilizing flanges 50a and 50b which form a rail receiving groove 50c and which extend downwardly on each side of the rail to engage the upper side portions of the rail 20 and stabilize the lateral movement of the carriage during its travel on the rails. A pair of bearings (not shown) may be mounted in bearing-mounting recesses 51 in the ends of the rollers 50.

It will of course be understood that various changes may be made in the details, form, arrangement and proportion of the parts herein described without departing from the scope of the invention which is set forth in the claims.

What is claimed is:

1. A device for slidably mounting a toolbox on the top edges of the sides of a pick-up truck, comprising:
   a pair of slide rails having upper roller engaging portions and lower attachment portions for positively attaching each of the rails to the upper portions of the respective sides of the pick-up truck body to position the roller engaging portions above the respective sides of the truck body substantially entirely outside a cargo carrying space defined between said sides,
   a pair of carriage units each having a pair of main rollers spaced apart for engaging top surfaces of the respective slide rails, means inside the toolbox for positively anchoring each carriage to the toolbox to prevent theft, means for locking at least one of the carriages to at least one of the rails in selected positions longitudinally of the pick-up truck, and stabilizing rollers mounted on said carriages below the main rollers for engaging said rails to stabilize the movement of the carriages on the rails.

2. The structure set forth in claim 1 wherein the slide rails have top and side roller engaging surfaces, and wherein said stabilizing roller engage the side surfaces of the rails.

3. The structure set forth in claim 2 wherein the stabilizing rollers are adjustable toward and away from the slide rail surface which they engage to provide stabilized smooth rolling action on the rails.

4. The structure set forth in claim 1 wherein the locking means includes at least one latch element carried by at least one of the carriages and releasably interlocking with cooperating portions of a rail.

5. The structure set forth in claim 4 wherein the locking means constitute a pair of latch members respectively mounted on the carriage units for releasably locking the carriage units to the respective rails, said rails being constructed to permit said carriages to be locked in selected positions along the length of the rails on the truck body.

6. The structure set forth in claim 5 and means interconnecting said latch members to actuate one latch member when the other is being manually actuated.

7. The structure set forth in claim 5 wherein the slide rails include a plurality of spaced latching holes at predetermined positions along said truck, and wherein the latch members include locking lugs respectively received in selected holes to position the toolbox.

8. The structure set forth in claim 4 and including a spring attached to the latch element to urge said latch into locking position.

9. The structure set forth in claim 5 wherein said latch members are pivotally mounted for movement into and out of locking position.

10. The structure set forth in claim 6 and including means for actuating one of said members into and out of locking position.

11. The structure set forth in claim 1 and said side rails being hollow and including means for positively extending said slide rails longitudinally rearwardly beyond the rear ends of the truck body sides to permit the carriages and a toolbox mounted thereon to slide beyond the rear ends of the truck body sides.

12. The structure set forth in claim 11 and means for positively locking said extension means into the slide rail and including a locking dog releasably interlocking with the permanent slide rail.

13. The structure set forth in claim 1 wherein the slide rails have a generally rectangular cross section and, the main rollers being generally cylindrical for rolling engagement with a top surface of each slide rail.

14. A device for slidably mounting a toolbox on the top edge surfaces of the sides of a pick-up truck, comprising;

a pair of slide rails extending upwardly above the sides of the pick-up truck and having bottom attachment portions for positively attaching bottom portions of the rails to top edge surfaces of the respective sides of the pick-up truck, a pair of carriage units each having a pair of main rollers spaced apart for engaging top surfaces of the respective slide rails, means inside of the toolbox for positively anchoring each carriage to the toolbox to prevent theft, means for locking the carriages to the rails in selected positions longitudinally of the truck body, and including stabilizing means associated with the main rollers for engaging side portions of said rails to stabilize the movement of the carriage units on the rails.

15. The structure set forth in claim 14, wherein said stabilizing means comprises a pair of spaced apart enlarged flanges on each side of the main rollers for engaging the side portions of said slide rails.

16. In combination with a pick-up truck including spaced apart upstanding truck body sides having top edges, a tool box having laterally extending supporting wing portions overlying the truck body sides, a hinged top cover, and a hinged rear closure panel, a pair of slide rails respectively mounted on the upper portions of the truck body sides and having upper roller engaging portions positioned above the top edges of the truck body in underlying relation to the wing portions of the box, a plurality of rollers mounted for rotation under the wing portions and riding on the slide rails, the hinged cover panel having a depending flange along the rear unhinged edge thereof, the rear closure panel having a lower hinged connection with the lower portion of the tool box to provide easy access directly into the tool box interior from the rear of the truck body for easy access when the tool box is moved to the rear of the truck body, portions of the upper free edge of the hinged rear closure panel extending upwardly a sufficient distance to underlie the depending flange of the hinged cover to retain the rear panel in closed position when the two panels are closed, a lock for locking the cover in closed position to simultaneously lock the rear closure panel in closed position, and means for positively anchoring the tool box in selected position on the slide rails.

17. The structure set forth in claim 16 wherein the hinged axis of the rear closure panel extends across the width of the tool box between the wings to open the entire rear side of the tool box and provide easy access into the box.

* * * * *